(12) United States Patent
Zhang et al.

(10) Patent No.: US 12,368,741 B2
(45) Date of Patent: Jul. 22, 2025

(54) BOT PREVENTION VELOCITY FRAMEWORK

(71) Applicant: Walmart Apollo, LLC, Bentonville, AR (US)

(72) Inventors: Jiawei Zhang, Pleasanton, CA (US); Neeraj Prasad, Santa Clara, CA (US); Jayakanthan Durairaj, Dublin, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 205 days.

(21) Appl. No.: 17/930,818

(22) Filed: Sep. 9, 2022

(65) Prior Publication Data
US 2024/0089276 A1    Mar. 14, 2024

(51) Int. Cl.
*H04L 67/55* (2022.01)
*H04L 9/40* (2022.01)

(52) U.S. Cl.
CPC ...... *H04L 63/1425* (2013.01); *H04L 63/1416* (2013.01); *H04L 67/55* (2022.05)

(58) Field of Classification Search
CPC .. H04L 63/1425; H04L 67/55; H04L 63/1416
See application file for complete search history.

(56) References Cited

U.S. PATENT DOCUMENTS

| 10,924,414 | B2 | 2/2021 | Murthy et al. |
| 2009/0158419 | A1* | 6/2009 | Boyce .................. G06F 21/575 726/13 |
| 2013/0346311 | A1* | 12/2013 | Boding .............. G06Q 20/3227 705/44 |
| 2015/0326592 | A1* | 11/2015 | Vissamsetty ........ H04L 63/1491 726/24 |
| 2017/0091809 | A1* | 3/2017 | Liu ..................... G06Q 30/0246 |

OTHER PUBLICATIONS

"Bot Detection: Learn and how bot detection works and how you can detect bots", Kasada, 2022, 35 pages.
"Cyberpedia: Bot Manager-Bot Detection", Radware, 2022, 6 pages.
(Continued)

*Primary Examiner* — Jung W Kim
*Assistant Examiner* — Howard H. Louie
(74) *Attorney, Agent, or Firm* — Morgan, Lewis & Bockius LLP; Manita Rawat (57) ABSTRACT

The embodiments relate to a system, a computer-implemented method, and a computer program product for performing bot detection using a velocity framework. For example, embodiments include a policy decision engine that can receive requests from a source, wherein each of the requests comprise velocity data including one or more attributes. The policy decision engine can monitor an occurrence of the velocity data in each request, and determine a velocity data rate for the velocity data in each request. Further, the policy decision engine can determine whether the request is a bot request based at least in part on the determined velocity data rate, and transmit a notification to the source of the request based at least in part on the determination of the bot request, wherein the notification indicates whether a bot request has been identified in the request.

20 Claims, 6 Drawing Sheets

(56) References Cited

OTHER PUBLICATIONS

"AWS WAF Bot Control", Amazon Web Services, 2022, 3 pages.
"How an Expertise in Bot Management Leads to More Intelligent Online Queuing", TrafficDefender, Apr. 13, 2021, 3 pages.
"Configure bot rules in Analytics", Adobe, Sep. 6, 2021, 2 pages.
DataDome, "Bot Protection and Online Fraud Prevention—Managing Bots for Global E-commerce Businesses," Nov. 3, 2021, 14 pages.
P. Sawers, "Human Security merges with PerimeterX to thwart bots and automated fraud," Jul. 27, 2022, 7 pages.
Perimeterx, Inc., "PerimeterX Bot Defender®—Secure Your Websites, Mobile Applications and APIs from Automated Bot Attacks," May 4, 2022, 2 pages.

\* cited by examiner

BOT PREVENTION VELOCITY FRAMEWORK

TECHNICAL FIELD

The disclosure relates generally to bot detection and, more specifically, to employing a bot prevention velocity framework for bot detection.

BACKGROUND

Retailers oftentimes have special sale events where limited quantities of items are made available for purchase. These items may be made available in-store or online. However, in today's environment, websites for online retailers are susceptible to being manipulated by bots. Resellers frequently use bots to purchase these limited, high-demand items and resell the items at an increased price for profit. Genuine customers are not left with any inventory to purchase and must wait until the items are restocked for a chance to purchase the items because bots are automated and operate faster than genuine customers. If these bots remain undetected, these high-demand items will likely be purchased by bots instead of genuine customers as intended by the retailer. There may be opportunities to improve bot detection by implementing a bot prevention velocity framework that can notify or perform mitigation measures to increase the sale to genuine customers.

SUMMARY

The embodiments of a bot prevention velocity framework described herein are directed to a system for implementing bot detection and bot prevention. A system for implementing a bot prevention velocity framework, the system comprises: a policy decision engine comprising at least one processor, wherein the policy decision engine is configured to receive at least one request from a source, wherein each of the at least one request comprises velocity data including one or more attributes; monitor an occurrence of the velocity data in each of the at least one request; determine a velocity data rate for the velocity data in each of the at least one request; determine whether the at least one request is a bot request based at least in part on the determined velocity data rate; and transmit a notification to the source of the at least one request based at least in part on the determination of the bot request, wherein the notification indicates whether a bot request has been identified in the at least one request.

A computer-implemented method comprising: receiving, at a policy decision engine, at least one request from a source, wherein each of the at least one request comprises velocity data including one or more attributes; monitoring, at the policy decision engine, an occurrence of the velocity data in each of the at least one request; determining, at the policy decision engine, a velocity data rate for the velocity data in each of the at least one request; determining, at the policy decision engine, whether the at least one request is a bot request based at least in part on the determined velocity data rate; and transmitting, at the policy decision engine, a notification to the source of the at least one request based at least in part on the determination of the bot request, wherein the notification indicates whether a bot request has been identified in the at least one request.

A non-transitory computer-readable medium having instructions stored thereon, wherein the instructions, when executed by at least one processor, cause a policy engine to perform operations comprising: receiving at least one request from a source, wherein each of the at least one request comprises velocity data including one or more attributes, wherein the one or more attributes of the velocity data comprises at least one of a customer identifier, customer profile information, customer account information, a device identifier, network identifier, shipping address, or billing information; monitoring an occurrence of the velocity data in each of the at least one request; determining a velocity data rate for the velocity data in each of the at least one request; determining whether the at least one request is a bot request based at least in part on the determined velocity data rate; and transmitting a notification to the source of the at least one request based at least in part on the determination of the bot request, wherein the notification indicates whether a bot request has been identified in the at least one request.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship."

Turning now to an overview of technologies that are more specifically relevant to aspects of the invention, customers and resellers frequently purchase items from online retailers and e-commerce stores because of their convenience. However, these online retailers and e-commerce stores can be manipulated by bots to make purchases for limited or high-demand items. Bots are programs that can run automated tasks to interact with various systems and/or users. These automated tasks can be executed very quickly and can include making online purchases. To attempt to prevent such unwanted activity, online retailers can require customers to join or create memberships where customers enter information such as their name, address, and billing information. The memberships can be used to allow customers to join exclusive promotional or sale events of limited or high-demand items. In some instances, bots can be used to create these customer accounts or memberships to join the sale events and use these fabricated accounts to purchase the high-demand items. Another mitigation strategy can include utilizing a waiting room or queue to sequence the customers for item purchases. Bots have been known to be used to acquire many of the limited positions in the waiting room or queue which displaces genuine customers.

Conventional techniques for bot prevention do not provide an efficient mechanism to identify potential bots that are used to purchase items from an online retailer quickly and accurately. As a result, many of the items will be purchased by undetected bots instead of genuine customers.

Turning now to an overview of the aspects of the invention, one or more embodiments of the invention address the above-described shortcomings of the prior art by providing a bot prevention velocity framework to mitigate the effects of bots on online retailers. The bot prevention velocity framework is used to monitor and analyze the purchase transaction data to determine bot activity/behavior or trends that may indicate bot activity/behavior. Each of these transactions, such as purchase requests, membership requests, billing updates, etc., with the online retailers generate data that can be used to determine bot activity. This data, referred to as velocity data, includes information and/or attributes to determine a measurable rate of its occurrence. This data can be collected, stored, analyzed, and further processed to identify characteristics and trends of bot activity. Velocity as used herein described the speed at which the data is processed. The velocity data can indicate repetitive requests within a short period of time that is uncharacteristic for a genuine customer and can be indicative of a bot. For example, the source identifier of the request can be detected and used to indicate a bot. It can be appreciated that policy rules that define any attribute or set of attributes of the request or transaction can be selected for bot identification. Also, the threshold number of detections and/or window of time can be selected for bot identification. Any combination of characteristics can be selected for bot identification and is not intended to be limited by the examples described herein. The techniques of one or more embodiments described herein can reduce the number of bots by dynamically and flexibly configuring policy rules that are used to identify the bots and take action to address the unwanted bots.

Figure 1:
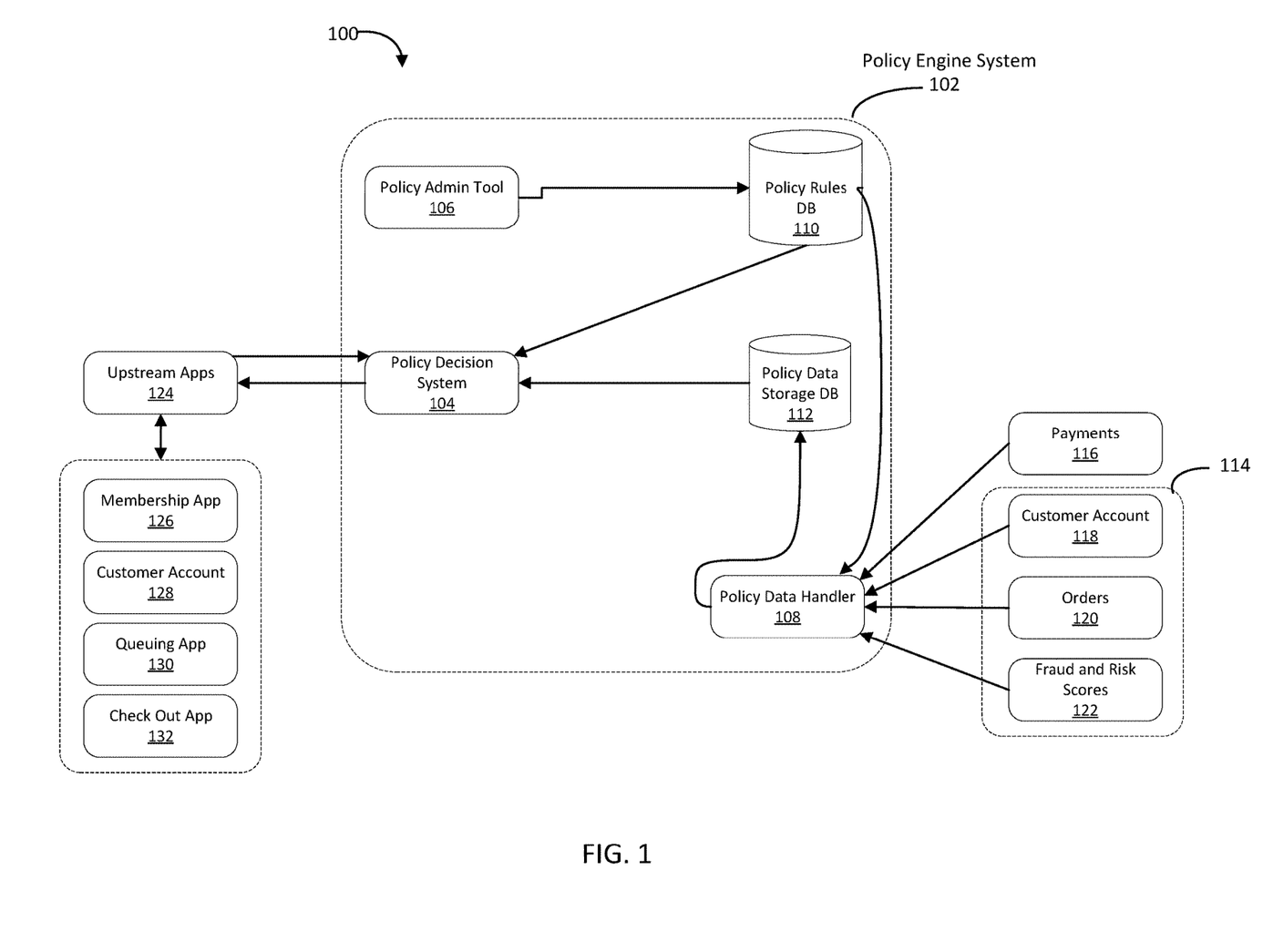
FIG. 1 is a block diagram of an exemplary bot prevention velocity framework in accordance with some embodiments.

Now referring to FIG. 1, a system 100 for implementing a bot detection velocity framework ("framework") in accordance with one or more embodiments of the present invention is provided. The framework can include a plurality of components to enforce configurable policy rules to perform the bot detection. System 100 includes a plurality of components and modules that can facilitate bot detection and bot prevention in the bot prevention velocity framework. In one or more embodiments of the invention, the policy engine system 102 includes a policy decision system 104, a policy administration tool 106, a policy data handler 108, a policy rules database 110, and a policy data storage database 112.

Policy decision system 104 is configured to analyze the captured data from a source and make determinations of bot detections based on enforcing policy rules. Bots are programs that can run automated tasks to interact with various systems and/or users. Examples of these automated tasks can include guessing the full credit card number, CVV code, and/or credit card expiration date by adding/updating credit card information repeatedly in a very short period of time. The repeated requests or bot behavior trigger unnecessary and a plurality of payment API calls which eventually go to the payment partners. These requests can increase the traffic in the network which can cause delays in processing or other issues in performance. This bot behavior generates that can be captured and analyzed by the framework. Policy administration tool 106 can be configured with a user interface (UI) and an application programming interface (API) that enables the configuration of these policy rules. The UI and API can be used to manage policy rules that are used by policy decision system 104 to identify bots and bot requests. For example, policy administration tool 106 can be used by an operator to create, update, enable, and disable policy rules to define attributes, thresholds, and configurations to identify bot activity. The configurable policy rules can define 1) a number of requests with the same user device identifier in x minutes that is greater than y; 2) a number of requests with the same network address in x minutes that is greater than y; 3) a number of requests with the same connection identifier in x minutes that is greater than y; or 4) a number of requests with the same session identifier in x minutes that is greater than y. In a non-limiting example, the threshold number of repetitive detections of an attribute can be specified, such as an attribute defining an IP address within a window of time of 5 minutes to indicate a bot. It should be understood that these configurable rules are examples and are not intended to limit the scope, and other examples are envisioned to be within the scope of the velocity framework.

The policy rules can define a duration or window of time for detecting a selected attribute from a request. The duration can be determined in various increments (second, minutes, hours, days, or weeks). The duration can also be selected based on the application and can be further modified based on the performance of the bot detection. The policy rules can define a threshold number of occurrences that an attribute is detected. In the event a threshold number of occurrences is exceeded during the defined duration, the policy decision system 104 can provide a decline decision to the upstream application 124 to indicate a bot has been detected. In the event the threshold is not exceeded by the policy decision system 104 an allow decision can be provided to the upstream application 124.

Policy rules database 110 is used to store the policy rules, thresholds, and configurations that have been defined and used for bot detection. In one or more embodiments of the invention, the policy rules including the configuration data and thresholds are pre-loaded into an application memory of policy decision system 104 from policy rules database 110. The analysis and processing of the velocity data is faster and the performance of the bot detection is improved because the delay in processing is reduced by executing the processing in the memory instead of loading/executing the instructions from the database.

Policy data handler 108 is a software routine that is configured to capture the data/velocities coming from one or more data sources communicatively coupled to policy engine system 102. The data sources can include payment systems, customer account systems, order history system, etc. During the velocity data capture flow, the policy engine system 102 collects the attributes or fields specified by the policy rules. The policy data handler 108 can be dynamically and flexibly configured to capture the attributes of interest in an active session or historical session based on the defined policy rules. The data can be obtained from user requests to purchase items, updates to account information, membership join requests, account creation requests, billing updates, etc. Also, the velocity data can be captured using a service or a dedicated capture API that is used to monitor the upstream application 124. The captured velocity data can be provided to policy data storage database 112 for analysis where the captured velocity data can include the number of times an attribute was detected within a window of time.

In one or more embodiments of the invention, the policy engine system 102 can be communicatively coupled to various external systems such as e-commerce applications of an enterprise network. In a non-limiting example, policy decision system 104 can provide an interface to communicate with one or more upstream applications 124. These upstream applications can include membership applications 126, customer account applications 128, queuing applications 130, and checkout applications 132. These applications can be accessed through user devices such as mobile phones, laptops, etc. It can be appreciated that other applications can communicate with the policy engine system 102 to request bot detection and is not limited by the illustration shown in FIG. 1.

Policy engine system 102 can receive requests from one or more upstream applications 124 to request bot detection. Policy engine system 102 is configured to implement the bot detection analysis and transmit a determination of the bot. The determination can include a decision to allow the request in the case a bot is not detected (i.e., a genuine customer) based on the policy rules or decline the request in the case a bot is detected. Upstream applications 124 can perform actions based on receiving the notification from the policy decision system 104. Actions can include but are not limited to 1) preventing membership requests; 2) disabling updating of payment information (e.g., billing information, credit card information, etc.); and 3) removing bot requests corresponding to determined bots from the queue and/or waiting room. It can be appreciated that other preventative or mitigating actions can be implemented by the bot prevention velocity framework and is not limited by the examples discussed herein.

Policy engine system 102 is not only configured to analyze incoming requests, but it can also identify bots from historical data stored in the policy data storage database 112. The historical data can be accessed by the policy decision system 104 to determine violations of the rules or determine trends/patterns in the data that are indicative of bot behavior. In a non-limiting example, the historical data can include payment information, customer order/purchase history, customer account information, etc.

Figure 2:
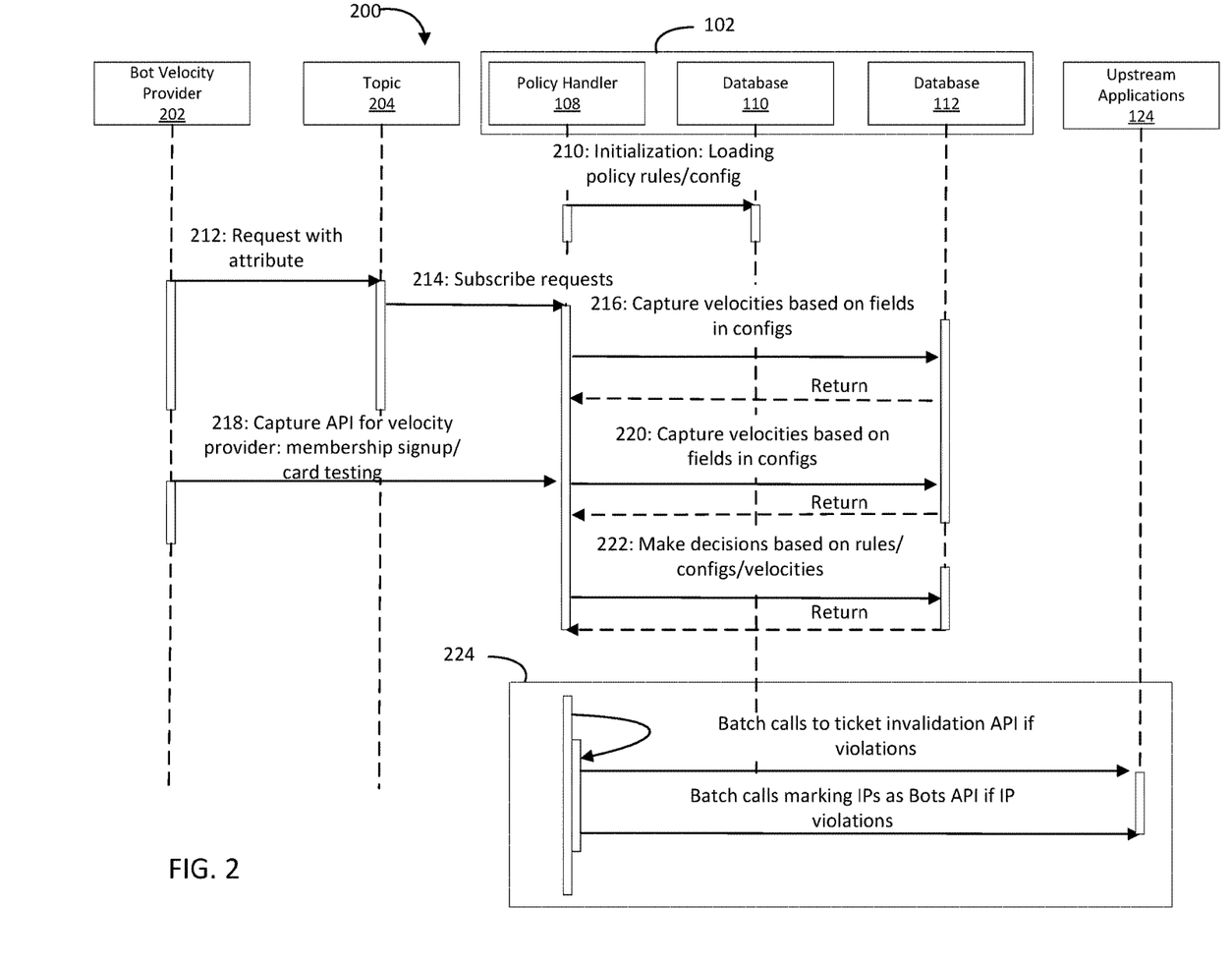
FIG. 2 is a diagram of an exemplary flow for capturing the bot velocity data using the policy engine system in accordance with some embodiments.

FIG. 2 is a diagram of an exemplary flow 200 for capturing the bot velocity data using the policy engine system 102 in accordance with some embodiments. Once the policy rules are created using the policy administration tool 106 or API, the policy rules can be stored in the policy rules database 110. At step 210 during the initialization process of the framework, policy data handler 108 of the policy engine system 102 pre-loads the policy rules, including the attribute data, threshold data, and configuration data, into the memory of the policy decision system 104 from the policy rules database 110. The performance of the bot detection is improved because the policy rules are executed from memory instead of the policy rules database 110. At step 212, a bot velocity provider 202 or a service (i.e., Kafka) can be used to monitor the velocity data in various transactions. At step 214, requests from various transactions containing the attributes defined in the configuration are transmitted to the topic 204, which in turn aggregates a number of requests in batches prior to sending the velocity data to the policy engine system 102. At step 216, policy data handler 108 captures the velocity data based on the fields identified in the configuration data and stores the corresponding data in the policy data storage database 112, and policy data storage database 112 stores the detected attributes in the transactions and a count representing the number of times the attributes were detected in the velocity data during the specified window of time.

At step 218 the bot velocity provider 202 continues to capture velocity data, such as membership requests, card testing, etc. and sends the velocity data to the policy engine system 102 which stores the velocity data at step 220 in the policy data storage database 112. At step 222, the policy decision system decides if a bot has been determined based on the defined policy rules, thresholds, and configurations. At step 224, the policy engine system 102 transmits the data to the upstream applications 124 to take one or more actions against the detected bots. For example, if ticket violations are detected or if IP violations are detected a decline notification can be transmitted to the upstream applications 124 to indicate that a bot has been detected. In some embodiments, tickets are issued when a customer requests to purchase an item and enters a waiting room or queue. If a single customer has requested a plurality of tickets within a short period of time specified by the policy rules, the customer may be identified as a bot. Similarly, if a number of requests originate from the same IP address within a specified period of time, a violation may be determined. The identified violations and the associated reasons may be transmitted to the upstream applications 124 periodically or upon the determination of a threshold number of bot detections. Messages indicating the violations can be aggregated in batches to reduce the amount of network traffic which increases the performance of the overall framework by leaving processing resources available for other tasks.

Figure 3:
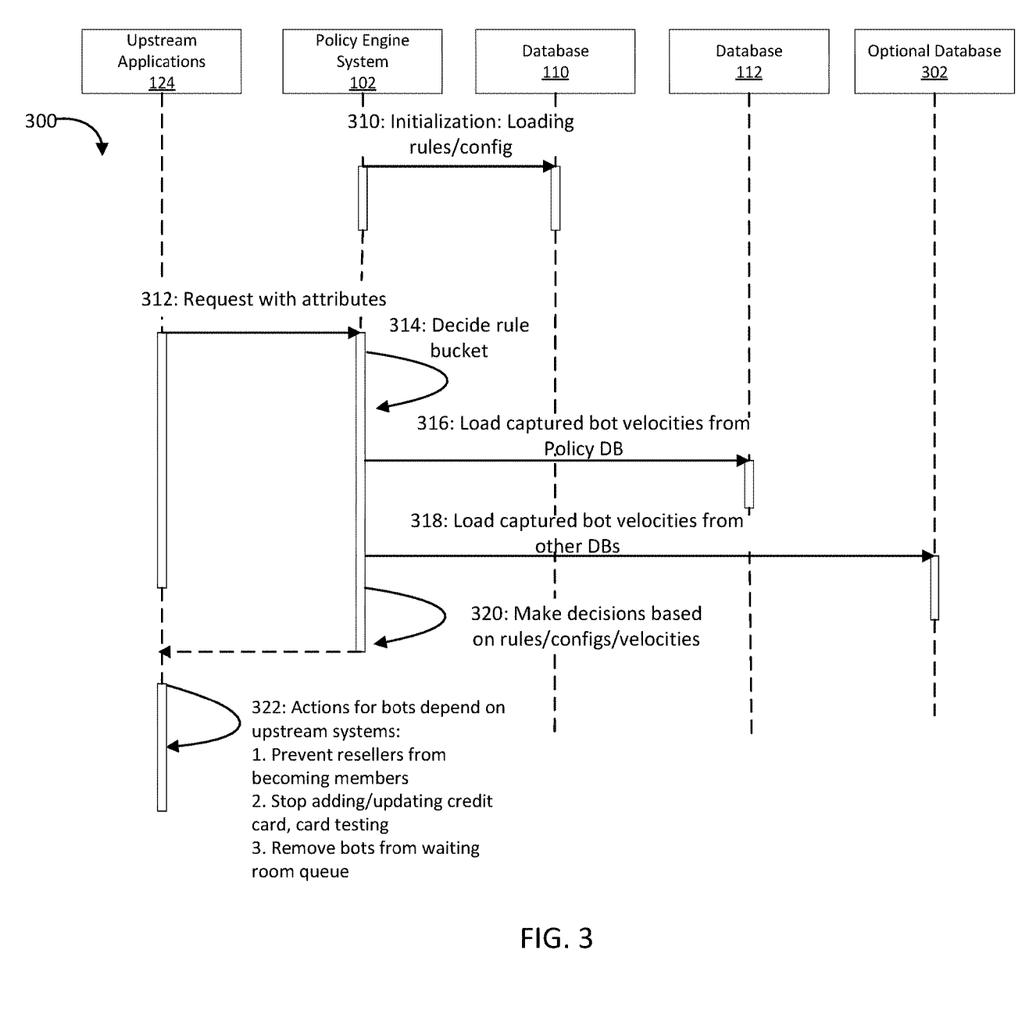
FIG. 3 is a diagram of an exemplary decision-making flow using the policy engine system in accordance with some embodiments.

FIG. 3 is a diagram of an exemplary decision-making flow 300 performed by policy engine system 102 in accordance with some embodiments of the invention. The decision-making flow 300 can be implemented in system 100 such as that shown in FIG. 1. The decision-making flow 300 begins at step 310 during an initialization process. At step 312, upstream applications 124 can provide requests for transactions that are occurring on the corresponding systems such as requests for purchases, requests for memberships, requests to update billing information, etc. At step 314, the policy engine system 102 can determine which policy rules and/or configurations apply to the requests and capture/filter the appropriate velocity data based on the policy rules. At step 316, the captured velocity is loaded into the policy data storage database 112. At step 318, the captured velocity data from other optional databases 302 or sources can be loaded into the policy data storage database 112 for analysis. At step 320, the policy engine system 102 determines whether any of the defined policy rules and/or configuration have been violated. In one or more embodiments of the invention, at step 322, upstream applications 124 can perform a variety of mitigation actions to address detected bots. For example, if a decline notification (bot detected) is provided from the policy decision system 104 and received at the upstream application 124, the upstream application 124 can prevent the creation of memberships. In another example, the upstream application 124 can prevent the addition/updating of credit card information. Additionally, the upstream application 124 can remove the identified bots from a waiting room or queue. Upstream applications 124 are not limited to the actions discussed herein.

Figure 4:
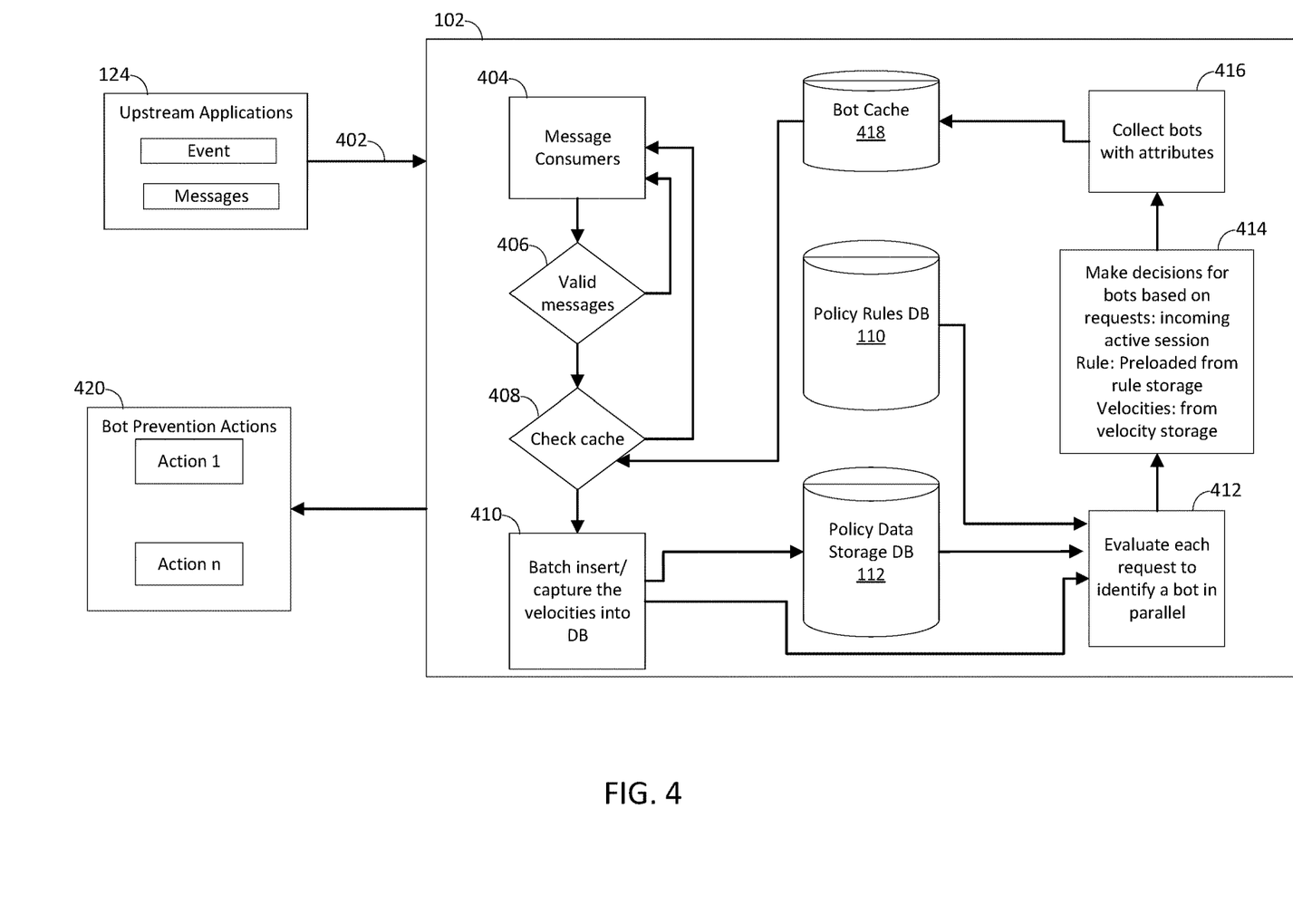
FIG. 4 is a block diagram illustrating an example bot prevention velocity framework of FIG. 1 in accordance with some embodiments.

FIG. 4 is a block diagram illustrating examples of the execution of the bot prevention velocity framework of FIG. 1 in accordance with some embodiments. During the processing of various transactions, upstream applications 124 can detect events such as purchase requests, membership requests, payment update requests, etc. Upon detection of a bot, the upstream application 124 can provide messages 402 to the policy engine system 102 for bot detection analysis. An event can trigger the upstream application 124 to transmit a message to the policy engine system. For example, when a user provides a request to join a waiting room or queue to purchase an item, adds/updates credit card, or modifies billing information associated with an account the message is transmitted.

In one or more embodiments of the invention, upstream application 124 can send batch messages for analysis instead of individually sending messages to the policy decision engine. For example, 10 requests can be sent in a single instance to reduce network traffic. In other embodiments, a different number of requests can be transmitted and is not limited by the examples discussed herein. At block 404, the messages are received. In some embodiments, at block 404 the received messages can be stored in a waiting room or queue. A configurable threshold number of messages can be accumulated and the messages can be processed in batches prior to proceeding to block 406. At block 406, it is determined whether the received messages are valid. In a non-limiting example, a user providing a request to join a waiting room or queue to purchase an item can be provided a ticket. The ticket can indicate a serving number, a position in a queue, an approximate waiting time, etc. While the user request is pending, the process can determine whether the user request corresponding to the ticket should be validated or not. Validated tickets are allowed to traverse the queue or allowed out of the waiting room to complete the transaction to purchase the item. In a different scenario, invalid messages may be generated if the sale event closes which terminates the waiting room or queuing system. During this time, customer requests may continue to enter the waiting room or queuing system resulting in invalid messages. It can be appreciated that other systems, such as upstream applications 124 can generate invalid message based on their internal issues/errors. If invalid messages are detected, the corresponding user requests or messages do not need to be processed inside the policy engine system which conserves resources.

At decision block 408, it is determined whether any previous bots have been identified based on one or more attributes of the policy rules and stored in the bot cache 418. In one or more embodiments of the invention, the policy engine system 102 can perform a search using the selected attributes and compares the attributes to the data entries in the bot cache 418. The search in the bot cache can be limited to a window of time that indicates bots that have been identified in the last x minutes. If the search reveals a match indicating a previously identified bot, a decline notification can be transmitted to take action at block 420. If not, the process continues to block 410 to capture velocity data for analysis. At block 412 each request is analyzed in parallel based on the stored velocity data and the defined policy rules. At block 414 a decision is made whether a bot has been detected or not. If a bot is detected, the process continues to block 416 to collect the associated attributes for the bot and store the bot attributes and identity in the bot cache 418. The bot identity stored in the bot cache 418 enables efficient detection of bots. The policy engine system 102 continues to monitor the requests based on the configurable policy rules.

Figure 5:
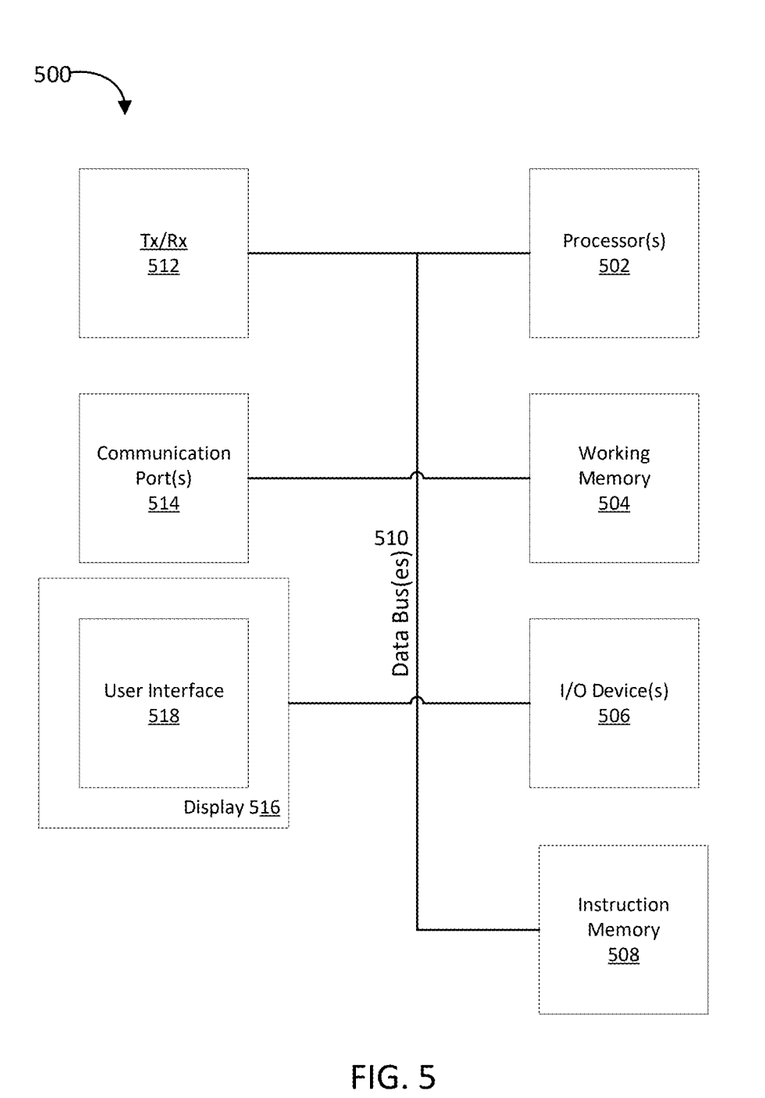
FIG. 5 is a block diagram of a computing device used in the bot prevention velocity framework in accordance with one or more embodiments of the invention.

FIG. 5 is a block diagram of an exemplary computing device 500 that may be representative of any component, engine, or module of FIG. 1 in accordance with one or more embodiments of the invention. For the sake of brevity, FIG. 5 is described relative to policy decision system 104. It should be appreciated, however, that the elements described can be included, as applicable, to any other network or system components of FIG. 1.

As shown, computing device 500 may include one or more processors 502, working memory 504, one or more input/output devices 506, instruction memory 508, a transceiver 512, one or more communication ports 514, and a display 516, all operatively coupled to one or more data buses 510. Data buses 510 allow for communication among the various devices. Data buses 510 can include wired, or wireless, communication channels.

Processors 502 can include one or more distinct processors, each having one or more cores. Each of the distinct processors can have the same or different structure. Processors 502 can include one or more central processing units (CPUs), one or more graphics processing units (GPUs), application specific integrated circuits (ASICs), digital signal processors (DSPs), and the like.

Processors 502 can be configured to perform a certain function or operation by executing code, stored on instruction memory 508, embodying the function or operation. For example, processors 502 can be configured to perform one or more of any function, method, or operation disclosed herein.

Instruction memory 508 can store instructions that can be accessed (e.g., read) and executed by processors 502. For example, instruction memory 508 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 502 can store data to, and read data from, working memory 504. For example, processors 502 can store a working set of instructions to working memory 504, such as instructions loaded from instruction memory 508. Processors 502 can also use working memory 504 to store dynamic data created during the operation of computing device 500. Working memory 504 can be a random access memory (RAM) such as a static random access memory (SRAM) or dynamic random access memory (DRAM), or any other suitable memory.

Input/output devices 506 can include any suitable device that allows for data input or output. For example, input/output devices 506 can include one or more of a keyboard, a touchpad, a mouse, a stylus, a touchscreen, a physical button, a speaker, a microphone, or any other suitable input or output device.

Communication port(s) 514 can include, for example, a serial port such as a universal asynchronous receiver/transmitter (UART) connection, a Universal Serial Bus (USB) connection, or any other suitable communication port or connection. In some examples, communication port(s) 514 allows for the programming of executable instructions in instruction memory 508. In some examples, communication port(s) 514 allow for the transfer (e.g., uploading or downloading) of data, such as recommendation data and customer interaction data.

Display 516 can display a user interface 518. User interface 518 can enable user interaction with computing device 500. For example, user interface 518 can be a user interface that allows an operator to interact, communicate, control and/or modify different features or parameters of computing device 500. The user interface 518 can, for example, display the performance of the computing device 500 using different textual, graphical or other types of graphs, tables or the like. In some examples, a user can interact with user interface 518 by engaging input/output devices 506. In some examples, display 516 can be a touchscreen, where user interface 518 is displayed on the touchscreen.

Transceiver 512 allows for communication with a network, such as the network of FIG. 1. For example, if network of FIG. 1 is a cellular network, transceiver 512 is configured to allow communications with the cellular network. In some examples, transceiver 512 is selected based on the type of system 100 will be operating in. Processor(s) 502 is operable to receive data from, or send data to, a network, such as network of FIG. 1, via transceiver 512.

Figure 6:
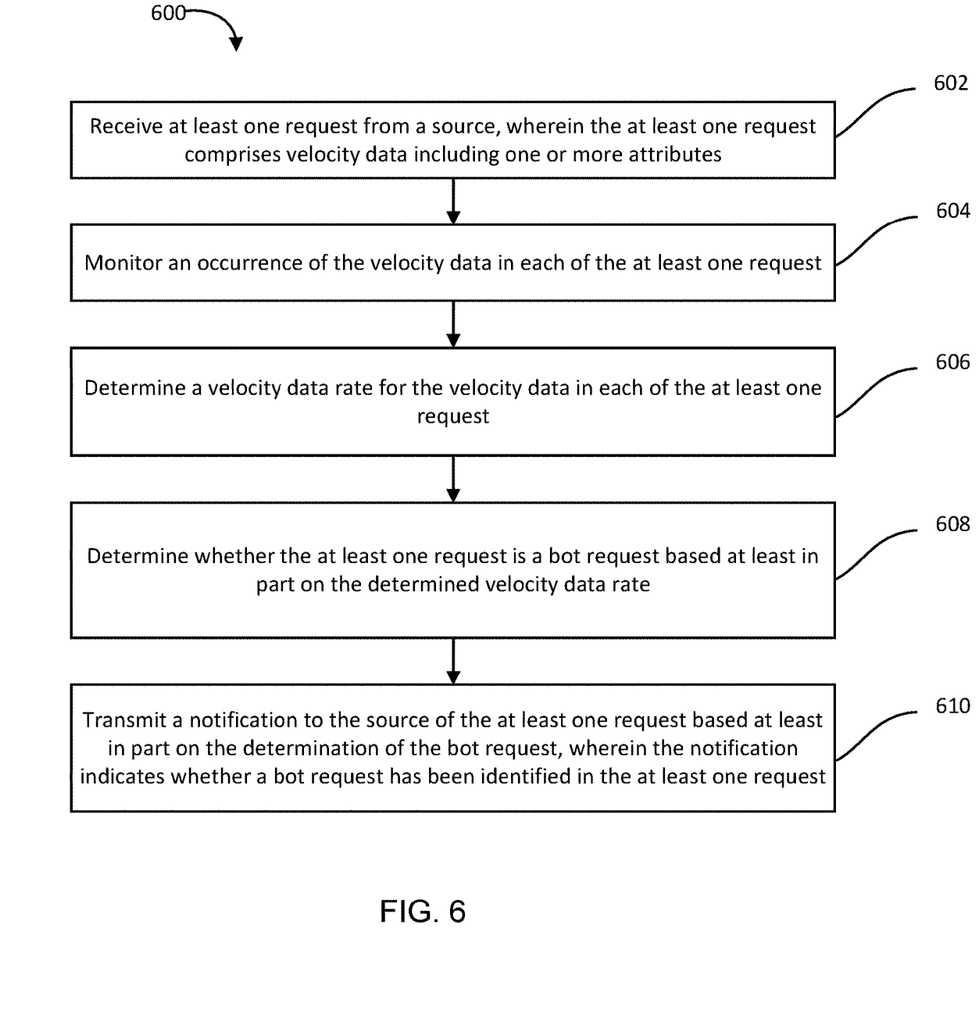
FIG. 6 is a flowchart of another example method that can be carried out by the policy engine system of FIG. 1 in accordance with some embodiments.

FIG. 6 depicts a flowchart of an exemplary method 600 for implementing a bot prevention velocity framework in accordance with one or more embodiments of the invention. Method 600 can be carried out by the policy engine system 102 shown in FIG. 1 in accordance with some embodiments. It can be appreciated method 600 can further be carried by a similar framework and is not intended to be limited by the illustration shown in FIG. 1. Beginning at step 602, the policy engine system 102 receives at least one request from a source, wherein each of the at least one request comprises velocity data including one or more attributes. The attributes of the velocity data comprise at least one of a customer identifier, customer profile information, customer account information, a device identifier, network identifier, shipping address, or billing information.

At step 604, policy engine system 102 monitors, at the policy decision engine, an occurrence of the velocity data in each of the at least one request. Velocity data from a purchase request, a membership join request, or other transaction requests can be monitored, and if detected by policy data handler 108, the velocity data can be stored in the policy data storage database 112 for subsequent analysis.

At step 606, system 100 determines, at the policy decision engine, a velocity data rate for the velocity data in each of the at least one request. Policy decision engine is configured to determine the velocity data rate by storing a count for each occurrence of the velocity data including the one or more attributes, and determining the count of each occurrence of the velocity data over a period of time for each of the at least one request.

At step 608, policy decision engine determines whether the at least one request is a bot request based at least in part on the determined velocity data rate. A policy decision engine is configured to compare the determined velocity data rate for the at least one request to a configurable threshold, and identify a bot request if the determined velocity data rate exceeds the configurable threshold, otherwise no bot request is determined for the at least one request. The configurable threshold can be defined by the policy rules stored in the policy rules database 110.

At step 610, policy decision engine transmits a notification to the source of the at least one request based at least in part on the determination of the bot request, wherein the notification indicates whether a bot request has been identified in the at least one request. In one or more embodiments of the invention, a decline notification can indicate that a bot request has been detected and an allow notification can indicate that no bot request has been detected. In one or more embodiments of the invention, the notification can include a reason for the determination of the bot request. For example, a decline notification can include the number of repetitive requests in a short window of time, multiple accounts having the same shipping address, or numerous updates to billing information indicative of guessing the correcting billing information, etc. Upon receiving the notification from the policy decision engine, the source or receiving application can take the appropriate mitigation actions to remove the bot requests.

Although the methods described above are with reference to the illustrated flowcharts, it will be appreciated that many other ways of performing the acts associated with the methods can be used. For example, the order of some operations may be changed, and some of the operations described may be optional.

The technical effects and benefits include a scalable bot detection system that can identify bots accurately with consistency. Also, the technical effects and benefits provide a framework that can be flexibly and dynamically configured as required policy rules to identify bots. The technical effects and benefits also provide a framework that is not limited to bot detection but can be implemented in any system used to filter data or identify data with particular characteristics.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system for implementing a bot prevention velocity framework, the system comprising:
   a policy engine system comprising at least one processor and a non-transitory memory storing instructions that, when executed, cause the at least one processor to:
   preload a set of policy rules including a set of attribute data of interest, a set of threshold data, and a set of configuration data into an application memory of the policy engine system from a database;
   receive a request from a first source, wherein the request comprises first velocity data including one or more attributes corresponding to the set of attribute data of interest;
   search a bot cache to determine whether a previous bot has been identified based on at least the set of policy rules and the one or more attributes;
   monitor an occurrence of the first velocity data in the request;
   capture second velocity data, distinct from the first velocity data, from a second source;
   determine a velocity data rate for the first velocity data and the second velocity data;
   in accordance with a determination that the search of the bot cache did not identify a previous bot, determine whether the request is a bot request based at least in part on the determined velocity data rate;
   allow the request to be performed upon a determination the request is not a bot request;
   prevent the request to be performed upon a determination the request is a bot request; and
   transmit a notification to the first source of the request based at least in part on the determination of the bot request, wherein the notification indicates whether the bot request has been identified in the request.

2. The system of claim 1, wherein determining the velocity data rate comprises the at least one processor executing the instructions to:
   store a count for each occurrence of the first velocity data including the one or more attributes; and
   determine the count for each occurrence of the first velocity data over a period of time for the request to determine the velocity data rate.

3. The system of claim 2, wherein determining whether the request is a bot request based at least in part on the determined velocity data rate comprises the at least one processor executing the instructions to:
   compare the determined velocity data rate for the request to a configurable threshold; and
   identify the bot request if the determined velocity data rate exceeds the configurable threshold, otherwise no bot request is determined for the request.

4. The system of claim 1, wherein the bot cache is communicatively coupled to the policy engine system.

5. The system of claim 4, wherein the at least one processor executes the instructions to determine whether the request is a bot request based at least in part on performing a search in the bot cache prior to determining the velocity data rate for the first velocity data and the second velocity data.

6. The system of claim 1, wherein the at least one processor executes the instructions to accumulate a threshold number of requests prior to determining the velocity data rate for the first velocity data and the second velocity data.

7. The system of claim 1, wherein the one or more attributes of the first velocity data comprises at least one of a customer identifier, customer profile information, customer account information, a device identifier, a network identifier, a shipping address, or billing information.

8. The system of claim 1, wherein the at least one processor executes the instructions to:
   receive a selection of first velocity data to monitor in the request; and
   monitor the first velocity data in the request based at least in part on the received selection.

9. The system of claim 1, wherein the at least one processor executes the instructions to identify the first velocity data for previously received requests based at least in part on historical data.

10. A computer-implemented method comprising:
    preloading a set of policy rules including a set of attribute data of interest, a set of threshold data, and a set of configuration data into an application memory from a database;
    receiving a request from a first source, wherein the request comprises first velocity data including one or more attributes corresponding to the set of attribute data of interest;
    searching a bot cache to determine whether a previous bot has been identified based on at least the set of policy rules and the one or more attributes;
    monitoring an occurrence of the first velocity data in the request;
    capturing second velocity data, distinct from the first velocity data, from a second source;
    determining a velocity data rate for the first velocity data and the second velocity data;
    in accordance with a determination that the search of the bot cache did not identify a previous bot, determining whether the request is a bot request based at least in part on the determined velocity data rate;
    allowing the request to be performed upon a determination the request is not a bot request;
    preventing the request to be performed upon a determination the request is a bot request; and
    transmitting a notification to the first source of the request based at least in part on the determination of the bot request, wherein the notification indicates whether the bot request has been identified in the request.

11. The computer-implemented method of claim 10, wherein determining the velocity data rate further comprises:
    storing a count for each occurrence of the first velocity data including the one or more attributes;
    determining the count for each occurrence of the first velocity data over a period of time for the request to determine the velocity data rate;
    comparing the determined velocity data rate for the request to a configurable threshold; and
    identifying the bot request if the determined velocity data rate exceeds the configurable threshold, otherwise no bot request is determined for the request.

12. The computer-implemented method of claim 10, further comprising determining whether the request is the bot request based at least in part on performing a search in a bot cache prior to determining the velocity data rate for the first velocity data in the request.

13. The computer-implemented method of claim 10, further comprising accumulating a threshold number of requests prior to determining the velocity data rate for the first velocity data in the request.

14. The computer-implemented method of claim 10, wherein the one or more attributes of the first velocity data comprises at least one of a customer identifier, customer profile information, customer account information, a device identifier, a network identifier, a shipping address, or billing information.

15. The computer-implemented method of claim 10, further comprising:
receiving a selection of the first velocity data to monitor in the request; and
monitoring the first velocity data in the request based at least in part on the received selection.

16. A non-transitory computer readable storage medium having instructions stored thereon, wherein the instructions, when executed by at least one processor, cause a policy engine to perform operations comprising:
preloading a set of policy rules including a set of attribute data of interest, a set of threshold data, and a set of configuration data into an application memory from a database;
receiving a request from a first source, wherein the request comprises first velocity data including one or more attributes corresponding to the set of attribute data of interest;
searching a bot cache to determine whether a previous bot has been identified based on at least the set of policy rules and the one or more attributes;
monitoring an occurrence of the first velocity data in the request;
capturing second velocity data, distinct from the first velocity data, from a second source;
determining a velocity data rate for the first velocity data and the second velocity data;
in accordance with a determination that the search of the bot cache did not identify a previous bot, determining whether the request is a bot request based at least in part on the determined velocity data rate;
allowing the request to be performed upon a determination the request is not a bot request;
preventing the request to be performed upon a determination the request is a bot request; and
transmitting a notification to the first source of the request based at least in part on the determination of the bot request, wherein the notification indicates whether the bot request has been identified in the request.

17. The non-transitory computer readable medium of claim 16, wherein the instructions, when executed by the at least one processor, cause the policy engine to perform operations comprising:
storing a count for each occurrence of the first velocity data including the one or more attributes;
determining the count for each occurrence of the first velocity data over a period of time for the request to determine the velocity data rate;
comparing the determined velocity data rate for the request to a configurable threshold; and
identifying the bot request if the determined velocity data rate exceeds the configurable threshold, otherwise no bot request is determined for the request.

18. The non-transitory computer readable medium of claim 16, wherein the instructions, when executed by the at least one processor, cause the policy engine to perform operations comprising:
determining whether the request is the bot request based at least in part on performing a search in a bot cache prior to determining the velocity data rate for the first velocity data in the request.

19. The non-transitory computer readable medium of claim 16, wherein the instructions, when executed by the at least one processor, cause the policy engine to perform operations comprising:
accumulating a threshold number of requests prior to determining the velocity data rate for the first velocity data in the request.

20. The non-transitory computer readable medium of claim 16, wherein the instructions, when executed by the at least one processor, cause the policy engine to perform operations comprising:
receiving a selection of the first velocity data to monitor in the request; and
monitoring the first velocity data in the request based at least in part on the received selection.

* * * * *